(12) United States Patent
Datta

(10) Patent No.: US 10,628,294 B2
(45) Date of Patent: Apr. 21, 2020

(54) MOCK SERVICES FOR SOFTWARE INFRASTRUCTURES

(71) Applicant: ELECTRONIC ARTS INC., Redwood City, CA (US)

(72) Inventor: Glen Van Datta, Blaine, WA (US)

(73) Assignee: Electronic Arts Inc., Redwood City, CA (US)

(*) Notice: Subject to any disclaimer, the term of this patent is extended or adjusted under 35 U.S.C. 154(b) by 29 days.

(21) Appl. No.: 15/467,926

(22) Filed: Mar. 23, 2017

(65) Prior Publication Data
US 2018/0276111 A1 Sep. 27, 2018

(51) Int. Cl.
G06F 11/36 (2006.01)
H04W 24/08 (2009.01)
H04B 17/309 (2015.01)

(52) U.S. Cl.
CPC ...... *G06F 11/3696* (2013.01); *G06F 11/3664* (2013.01)

(58) Field of Classification Search
CPC .................... G06F 11/3696; G06F 11/3664
USPC ....................................................... 717/135
See application file for complete search history.

(56) References Cited

U.S. PATENT DOCUMENTS

| 5,335,339 | A | * | 8/1994 | Maejima | ............... | G06F 11/328 |
| | | | | | | 703/21 |
| 5,513,315 | A | * | 4/1996 | Tierney | ............... | G06F 11/3688 |
| | | | | | | 714/10 |
| 7,181,360 | B1 | * | 2/2007 | Nikolac | .................. | H04L 43/50 |
| | | | | | | 702/119 |
| 9,081,896 | B1 | * | 7/2015 | Efremov | ............. | G06F 11/3664 |
| 2005/0010661 | A1 | * | 1/2005 | Southam | ................. | H04L 43/50 |
| | | | | | | 709/224 |
| 2009/0007073 | A1 | * | 1/2009 | Huang | ................ | G06F 11/3696 |
| | | | | | | 717/124 |

(Continued)

OTHER PUBLICATIONS

Iftikhar et al, "An Automated Model Based Testing Approach for Platform Games", [Online], 2015, pp. 426-435, [Retrieved from internet on Jan. 20, 2020], (Year: 2015).*

(Continued)

*Primary Examiner* — Thuy Dao
*Assistant Examiner* — Zengpu Wei
(74) *Attorney, Agent, or Firm* — Lowenstein Sandler LLP

(57) ABSTRACT

A load test environment computing system may include an electronic data store configured to store a configuration tool to generate a software infrastructure and an error analysis utility and one or more hardware processors configured to execute specific computer-executable instructions to cause the configuration tool to generate a configurable mock service. The configurable mock service may include an executable file and a service component of the mock service. The executable file may identify a hardware property of the service component, an operative functionality of the service component, and an electronic communication between the configurable mock service and at least one of: a client device, a database, or an external service. The one or more hardware processors may further be configured to execute specific computer-executable instructions to cause the configuration tool configuration tool to simulate the software infrastructure.

20 Claims, 9 Drawing Sheets

(56) References Cited

U.S. PATENT DOCUMENTS

| | | | | |
|---|---|---|---|---|
| 2010/0151926 A1* | 6/2010 | Ruppert | ............... | G06F 8/60 |
| | | | | 463/1 |
| 2012/0101799 A1* | 4/2012 | Fernandes | ........... | G06F 11/3414 |
| | | | | 703/21 |
| 2012/0131095 A1* | 5/2012 | Luna | ................ | H04L 67/04 |
| | | | | 709/203 |
| 2012/0209571 A1* | 8/2012 | Peterson | ............ | G06F 11/3616 |
| | | | | 702/186 |
| 2013/0159964 A1* | 6/2013 | Szpak | ................ | G06F 11/3684 |
| | | | | 717/105 |
| 2017/0287285 A1* | 10/2017 | Yee | ................ | G07F 17/3293 |

OTHER PUBLICATIONS

Cho et al, "Online Game Testing Using Scenario-based Control ofMassive Virtual Users", [Online], 2010, pp. 1676-1680, [Retrieved from internet on Jan. 20, 2020], (Year: 2010).*

Cho et al, "Scenario-Based Approach for Blackbox Load Testing of Online Game Servers", [Online], 2020, pp. 259-265, [Retrieved from internet on Jan. 20, 2020], (Year: 2010).*

* cited by examiner

MOCK SERVICES FOR SOFTWARE INFRASTRUCTURES

TECHNICAL FIELD

The present disclosure is generally related to mock services for software infrastructures and is more specifically related to configuring a mock services validation environment for video game systems.

BACKGROUND

Load test environments for end to end system level validation of software infrastructures can be costly, but are often utilized to ensure production environments are resilient when released. A load test environment may simulate a production environment of software infrastructures by replicating and/or simulating component and services of a production environment. A load test environment may stress-test a software infrastructure to validate integrity of software infrastructures before implementing the software infrastructure in a production environment.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1A:
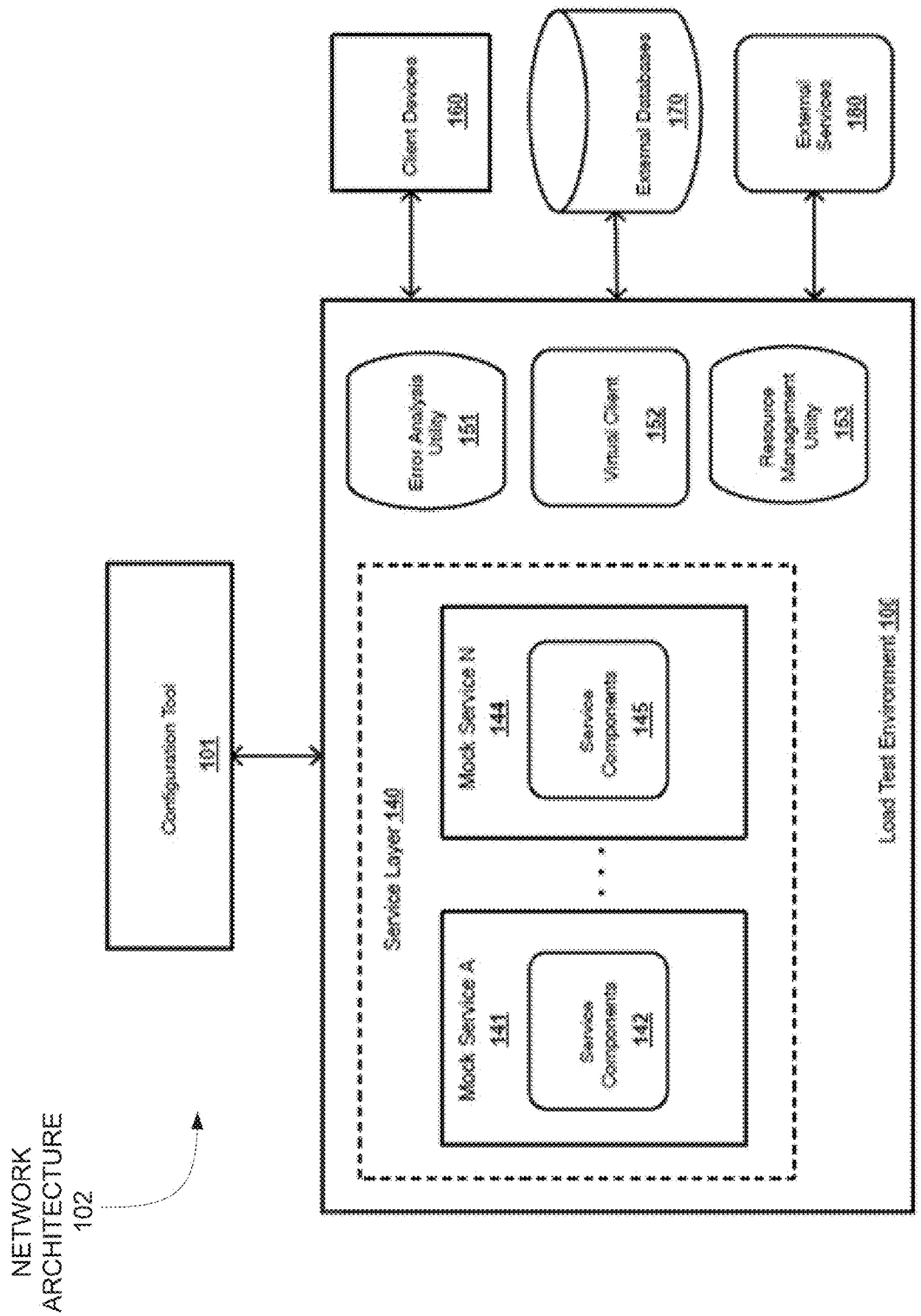
FIG. 1A is a block diagram illustrating an exemplary network architecture in which embodiments of the present disclosure may be implemented.

It may be advantageous, in one embodiment, to validate a software infrastructure (also referred to herein as "software environment" and "software system") in a load test environment prior to implementing the software infrastructure in a production environment. In one embodiment, a software infrastructure may include software and related services for a video game. Software developers may utilize various validation techniques (e.g., load testing, stress testing, etc.) to validate software infrastructures in a load test environment to determine if an implementation a video game (or other software) can sustain a real-world load. In one embodiment, if the software infrastructure of the game is not accurately simulated in a load test environment, the simulation may not provide a developer with accurate performance results.

In one embodiment, a simulated software infrastructure includes the simulation of a mock service. A mock service may be used to replicate the functionality of an existing service or to replicate the functionality of a service in development (e.g., a new service or an update to an existing service). In one embodiment, a mock service works independently as a standalone simulation to validate the functionality of a corresponding service. In one example of a service simulator, a single pipeline may dedicated to managing communication (e.g., requests and responses) that a mock service receives and sends to a set of client devices, to validate the operative functionality of the components within the mock service. Such operations may provide developers with an insight to the operative functionality of the components of a service under a load distributed over a single pipeline, but it may be advantageous to determine how the service can manage real world errors (e.g., packet loss, latency, disconnections, queued requests, etc.) in a multi-pipeline environment of a large user base whose requests to various services and other computing devices operate simultaneously.

Online video game infrastructures are an example of multi-pipeline environments that connect a large user base with multiple services, some of which operate in parallel and/or dependently upon one another. Simulating a full scale multi-pipeline environment can be computationally expensive due to the amount of hardware utilized to simulate each service and client device of the environment. In one embodiment, a mock service includes a hardware configuration equivalent to that of a respective production environment in order to obtain accurate operative performance results. In this embodiment, simultaneously simulating mock services of a software infrastructure in a load test environment may be as computationally expensive as running the production environment for the software infrastructure.

In one embodiment, to reduce computational costs in a load test environment, a scaled-down multi-pipeline software environment may be utilized, which may proportionally decrease hardware utilization and operative functionality with respect to size of the production environment. Although it may possible to introduce systematic error in a scaled-down software infrastructure, the load test environment may not experience standard error in the same way a full scale environment would due to a lack of message traffic from the condensed network topology, smaller user base, and lower operative load. A scaled-down environment is may be unable to accurately simulate real world errors of a full-scale environment, which may decrease accuracy when determining the stability of a software infrastructure.

In addition to inefficient and inaccurate methods of simulating multi-pipeline software infrastructures with a single mock service and a scaled down environment, software developers also encounter the problem of being unable to replicate (e.g., simulate) a proprietary service. Some service providers do not openly disclose their service components and specifications (e.g., system level components, executable files, hardware dependencies, internal topology, verification algorithms, and other functional elements) and, in such instances, a developer is may be unable to replicate the operative functionality of that proprietary service. In online video game infrastructures, first party proprietary services (e.g., Xbox Live and PlayStation Network) may be an integral part of the environment, which may problematic for validation.

Embodiments described herein include a software infrastructure utilizing mock services with configurable components to validate a video game infrastructure by systematically inserting error into the validation environment. A software infrastructure may utilize real services and mock services interchangeably during validation. The configurable components of a mock service may be software based components that replicate operative functionality of a respective production scale service, allowing the mock service to operate at a lower cost. The reduced cost of these mock services may enable developers to simulate a full-scale software infrastructure that introduces various errors and failures that may occur in a respective production environment without completely replicating the full-scale service. As described herein, in one embodiment, latency and bandwidth constraints may be mimicked (e.g., injected into and/or analyzed) by mock services running in the software infrastructure. Mock services may return latency and bandwidth information relating to simulation data provided by the mock service.

Advantageously, some embodiments described herein to validate load test environments of multi-pipeline software infrastructures may eliminate or reduce the desire to replicate any service dependencies. Furthermore, because a mock service approximates operative functionality, the operations described herein may utilize previously obtained communicative data elements (e.g., requests, responses, tokens, etc.) from proprietary services to model as a mock service in the load test environment.

Embodiments of the present disclosure provide for methods and systems for creating and testing dynamic software infrastructures. For purposes of this disclosure the term "client device" refers to a computing device executing a software application that interacts with network based computing services of a software infrastructure. As an example, a client device may be a gaming console configured to play over an online gaming network. For purposes of this disclosure, the term "real service" or "service" refers to one or more computing devices in a software infrastructure configured to receive requests and process a response (e.g., login verification, server authentication, data management, data downloads, etc.).

FIG. 1A is a block diagram illustrating an exemplary network architecture 102 in which embodiments of the present disclosure may be implemented. Network architecture 102 may include a load test environment 100, including utilize mock services 141, 144 to create a service layer 140 in accordance with one embodiment of the present disclosure. In one embodiment, a software infrastructure may be configured by a configuration tool 101 of the load test environment 100. The configuration tool 101 may be a software utility used to configure the software infrastructure. Additionally, the load test environment 100 may include an error analysis utility 151 and a resource management utility 153 for monitoring and managing operative performance and a virtual client 152 for simulating client devices. The network architecture 102 may include client devices 160, external databases 170 and/or external services 180.

On one embodiment, load test environment 100, configuration tool 101, client devices 160, external databases 170 and or/external services 180 of network architecture 102 may represent separate servers communicating with each other over one or more networks. Networks can be a local area network (LAN), a wireless network, a telephone network, a mobile communications network, a wide area network (WAN), such as the Internet, or similar communication system.

Servers may be implemented by a single machine or a cluster of machines. Servers may include, for example, computer system 700 of FIG. 7. In one embodiment, external database 170 may be included in load test environment 100. In another embodiment, external database 170 may be external to load test environment 100. External database 170 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. In one embodiment, user device 130 may be any computing device (e.g., personal computer, server, mobile device, tablet, game system, etc.). User device 130 may include, for example, computer system 700 of FIG. 7.

In the exemplary embodiment shown in FIG. 1A, the service layer 140 includes mock services 141, 144 to replicate the operative functionality of a software infrastructure. The amount of mock services used to accurately approximate a software infrastructure may vary between infrastructures and can be expanded if desired. For example, in the case of a newly developed service dependency of other services (e.g., a service that depends on another service), a software developer may incorporate mock service versions of the new system dependencies to test their functionality, though they may not be necessary to approximate the operative functionality of the software infrastructure as whole. In such instances, a developer may utilize a traditional one-to-one mock service implementation of the service dependencies to test functionality fully, though it may be preferable to use the configurable service components 142, 145 of a mock service (items 141, 144) to replicate functionality.

In one embodiment, the service layer 140 functions as a layer of abstraction in the load test environment 100. The service layer 140 may be the initial layer of communication between client devices 160 and the remainder of the infrastructure. For example, the service layer 140 may receive and respond to various communications between a client device 160 and respective mock services 141, 144. In the instances of complicated environments that include dependencies to services, each mock service may function in a separate layer with respect to communicative end points (e.g., connected nodes).

In some embodiments, a load test environment 100 includes an error analysis utility 151, a virtual client 152, and a resource management component 153. The error analysis utility 151 may be a software tool that enables load test environment 100 to monitor the performance of the software infrastructure in real time by interpreting operative logs. Additionally, the error analysis utility 151 can also monitor the operative performance of any additional internal and external operations and services.

A virtual client 152 is one or more simulations of a client device executing a video game that communicates with the service layer 140 of the load test environment 100. The virtual client 152 can be configured to instruct each simulated client device to uniquely manipulate a video game. By way of the configuration tool 101, a developer can also configure a virtual client 152 to dynamically change in size during simulation to create a load test that more accurately is representative of a real-world user base (i.e., users who login and users who log off their devices).

In one embodiment, resource management utility 153 may allocate hardware resources of the load test environment 100. For example, if the error analysis utility 151 indicates that configurable mock service 141 is operating inefficiently, a developer may utilize the resource management utility 153 to allocate unused or additional resources of the load test environment 100 to assist the mock service 141. Additionally, a developer may configure the resource management utility 153 to manage permissible resource allocations for the dynamic scaling of simulated clients in the virtual client 152 module. In some embodiments, load test environment may connect to external components. For example, a load test environment may utilize a set of real client devices 160 to validate a software infrastructure. In another embodiment, load test environment may also communicate one or more external databases 170 and external services 180 to further validate a particular mock service.

Merely to simplify discussion and not to limit the present disclosure, a single load test environment 100 for a single gaming infrastructure with a single configuration tool 101 is used by way of example. However, multiple configurations and multiple infrastructures within one or more load test environments for one or more software applications may be validated. Additionally, any of the components described herein may be communicatively operative with one another, as well as with any of the mock services of the service layer 140, as well as with the external components in communication with the load test environment 100. The internal components of load test environment may operate as stand-alone executables or utilities that operate in parallel with a simulation of the service layer 140, wherein each module includes an interface in the configuration tool 101.

Figure 1B:
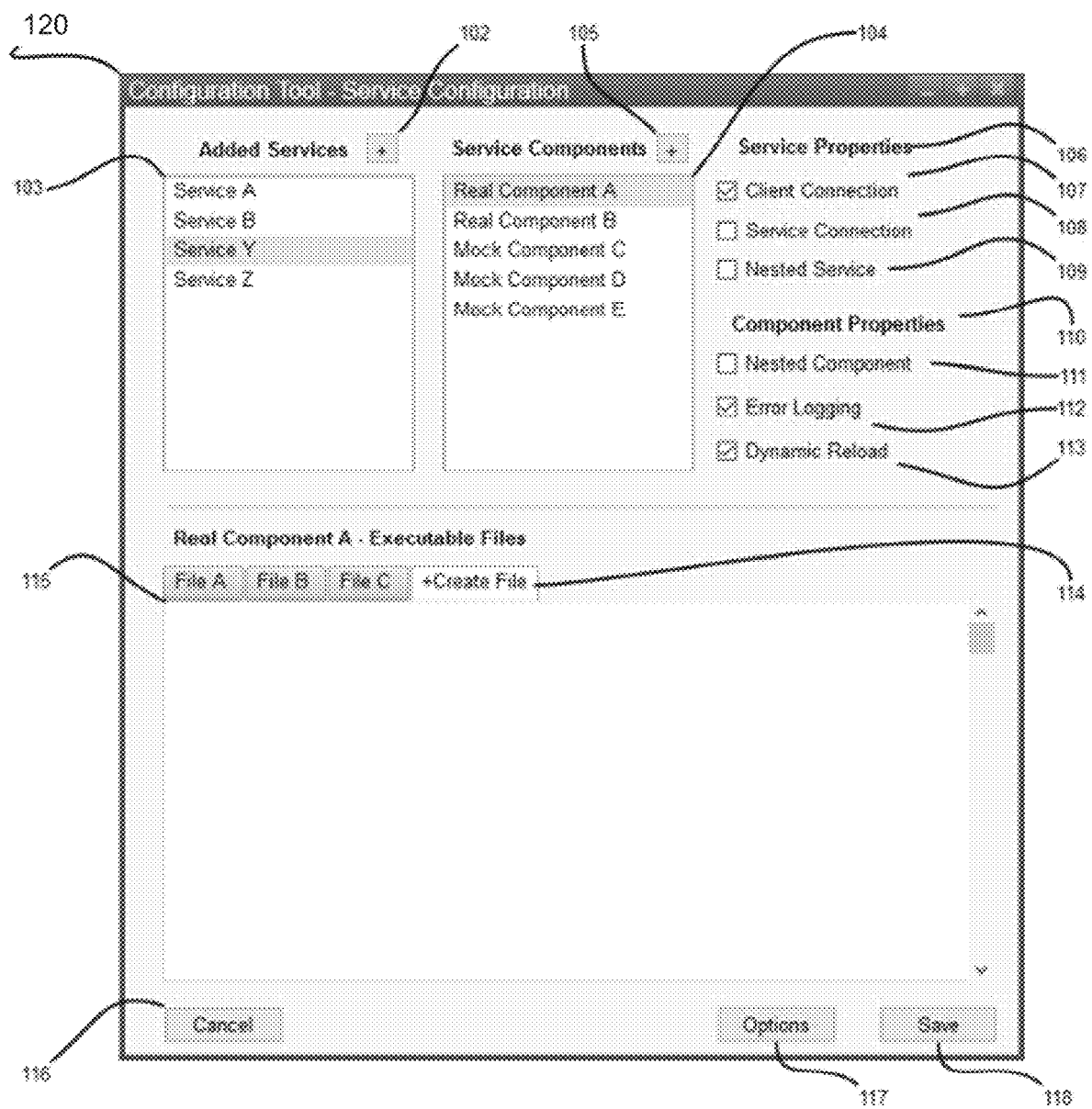
FIG. 1B is block diagram illustrating a configuration tool graphical user interface, according to an implementation.

FIG. 1B is block diagram illustrating a configuration tool graphical user interface (GUI) 120 for the configuration tool 101 of FIG. 1, according to an implementation.

In one embodiment, GUI 120 enables a software developer to quickly define the high-level design, topology, and functionality of load test environment 100 for FIG. 1. The GUI 120 may enable a software developer to define any low-level operations of service components in a text editor for executable files. To provide a greater approximation of operative functionality, a developer may use the GUI 120 to include both real and mock service components in a mock service.

In one embodiment, a developer may be unable to access various specifications and components of a service, such as proprietary services. In this embodiment, a developer may use a mock service to approximate the functionality of the service based on obtainable data elements from the proprietary service. For example, in gaming infrastructures a client device may be video game console that periodically makes requests to a first party proprietary service, such as Xbox Live. The periodic request from the game console may include a variety of requests (e.g., account updates, player achievement updates, player availability, and player verification) that occur throughout a user's gameplay session.

In the exemplary embodiment shown in FIG. 1B, a software developer may create mock services for a software infrastructure using the add button 102 in the GUI 120. Alternatively, the add button 102 can add an existing configured service to a software infrastructure. The added services list 103 below the add button 102 presents a list of configurable mock services that are currently a part of the software infrastructure. If a configured service is selected from the added services list 103, respective service components 104 may be presented by GUI 120. Service components may be added to a selected configured service using the add button 105 above the service components list 104.

The GUI 120 may allow various high level service properties 106 for a selected configured service to be defined. In one embodiment, a developer may assign a client connection 107 or service connection 108 to the configured service. In one embodiment, enabling client connection 107 and service connection 108 in a configured service may configures a topology that enables client devices and other services to communicate with the configured service. The properties of service components 104 within each configured service 103 may be adjusted and defined within the GUI 120.

The GUI 120 can be used to create, modify, delete, replace, and service components in a mock service. In one embodiment, the components properties list 110 includes selectable properties for the service components. The nested component property 111 enables a developer to create or assign a service component within another service component. This feature allows for modular component design, which can benefit the operative performance the software infrastructure. Error logging 112 may enable a service component to track operative performance, such as through an operative log that can be analyzed by a developer and interpreted through a utility.

In one embodiment, the dynamic reload property 113 enables a developer to assign multiple functionalities to a service component or a mock service entirely. For example, if a service component is assigned a primary functionality, the dynamic reload property 113 enables a developer to define various functionality reload points that may cause the primary functionality of a service to be altered in part or entirely; the defined reload points for dynamic reloads can be predefined such that they are invoked after a period of time, or once execution of the service component has been complete. A developer may invoke or create a defined reload point at any time during simulation by way of the GUI 120, enabling one or more service components and configured services to change functionality or be disabled in real time. Additionally, the dynamic reload point of a mock service can be used to substitute the real service it is replicating, either through manually invoking the real service or predefined parameters that are automatically invoked.

In some embodiments, a mock service includes one or more executable files that define operative functionality of the mock service. An executable file may include any computer readable, interpretive, or executable file types (e.g., source, object, machine, template, script, feed, and the like) containing one or more programmable languages (e.g., assembly, C, C#, C++, java, JavaScript, SQL, Perl, PHP, and the like). For example, a mock service may include an executable file that defines the operative functionality of service ports, authentication and verification logic for requests, message response generation, hashing, API calls, data management, user profiling, and other service functionalities. The configuration tool 101 of the load test environment 100 may modify the executable files of the configurable mock service.

In some embodiments, a developer may view, edit, save, and create executable files for a service component within the GUI 120. The file tabs 115 in the lower portion of the GUI 120 may be representative of the executable files of a selected service component in the service component list 104. The text editor below the script tabs 115 may allow a developer to create, by way of programmable computer code, functionality of a service component. The create file tab 114 may allow a developer to create a new executable file, enabling developers to incorporate additional functionality to service component without the need to modify the existing script code. Additionally, the GUI 120 may include a cancel button 116 for undoing any unsaved changes to configured services 103, service components 104, and executable files 115. An options button 117 is also included in the configuration tool 101, which may allow for change and access to various settings such as the layout of the GUI 120, expanding the list of properties for services 106 and service components 110, and viewing additional GUI windows of the GUI 120 such as a topology editor, resource allocator, component layer editor, and an external component editor. Furthermore, a save button 118 is displayed to save changes to all services and their respective components and properties.

To simplify discussion and not limit the present disclosure, a single GUI 120 is used by way of example to illustrate an embodiment of the configuration tool 101, however, multiple configurations of one or more GUIs including drop down menus, pop up items, tool tips, hyperlinks, text editing tools, connection port tools, visualization tools, topology tools, and other features may also be displayed on GUI 120 or related GUIs. The configuration tool 101 (via GUI 120, for example) may also including functionality for deleting, altering, disabling, and enable various services, components, and properties at any time, such as through a right click drop down menu. The listed configured services 103 and service components 104 are used by way of example and do not portray the specific design of a given software infrastructure. The service components list 104 lists "real components" and "mock components" as means to exemplify a configurable mock service's capacity to contain service components of both a mock service and an existing service.

Figure 2:
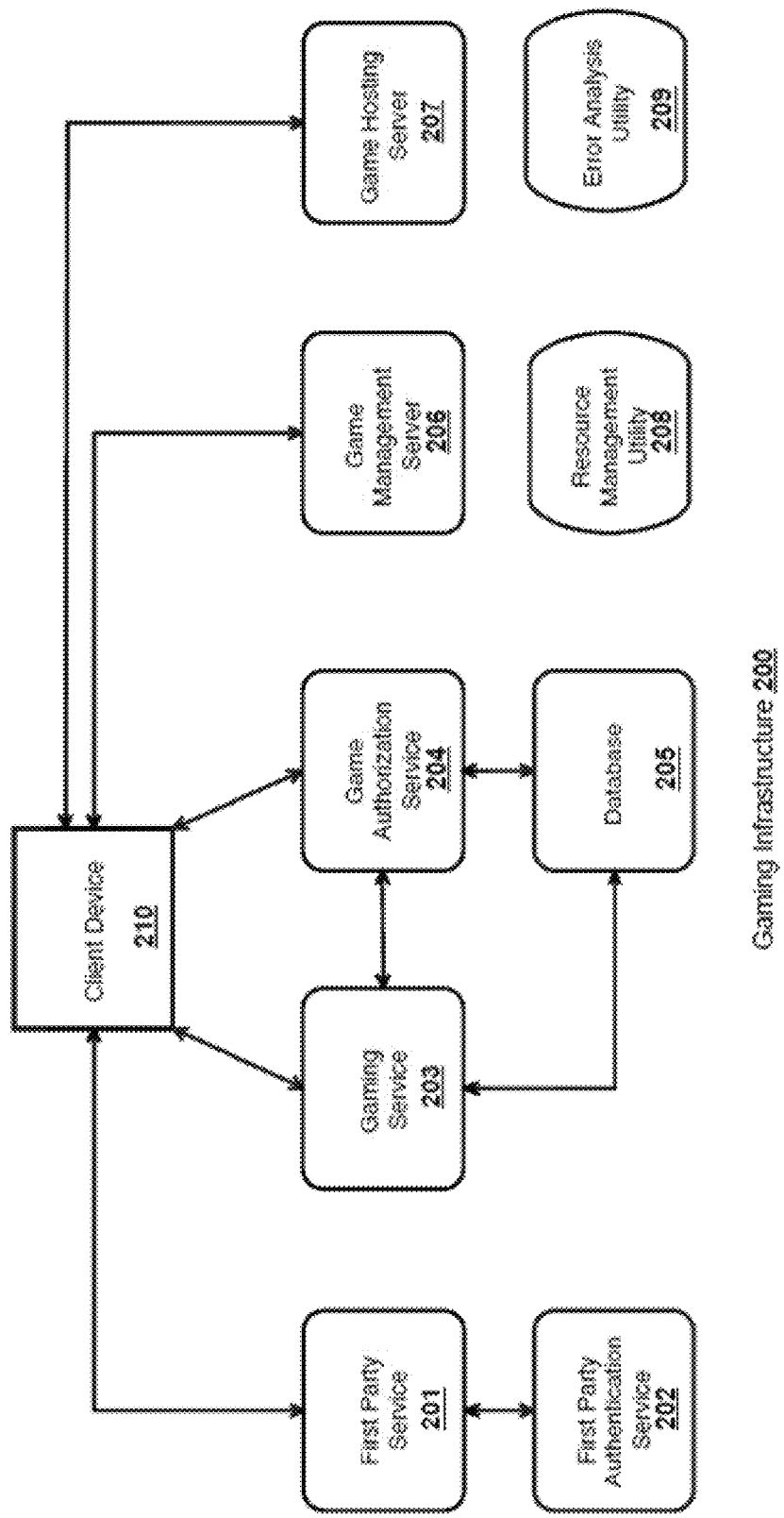
FIG. 2 illustrates an embodiment of a software infrastructure including configured services, according to an implementation.

FIG. 2 illustrates an embodiment of a gaming infrastructure 200 including configured services, according to an implementation. In one embodiment, the gaming infrastructure 200 is to manage online video game services of a video game application running on a client device 210. In some embodiments, the client device 210 is a computing device, such as a video game console or virtual machine, executing a video game. In another embodiment, client device 210 may represent a service of gaming infrastructure (e.g., services and/or client devices may be in communication with other client devices and/or services in gaming infrastructure 200). As used herein, services and client devices may serve as entry points into software infrastructures utilizing mock services. In one embodiment, the infrastructure 200 includes a first party service 201 that simulates the authentication response of a user login from the client device 210 by calling a first party application service 202 to verify the identity of a user. In one embodiment, gaming platforms enable users to join a gaming subscription service (e.g., a first party service 201 such as Xbox Live and PlayStation Network), which in turn may verify the identity of the user in order to engage in online gameplay. In some embodiments, the first party service 201 may rely on a service dependency, such as a first party authentication service 202, to verify the identity of the user prior to granting online gaming access.

In one embodiment, game service 203 is an online service associated with the video game application executing on the client device 210. The game service 203 may perform additional player verification by calling a game authorization service 204. In one embodiment, identity verification may be performed by the first party authentication service 201 and/or the game authorization service 204 using token-based authentication. In another embodiment, login information such as a username and password may be used to verify identity of the user. In some embodiments, the game service 203 and/or the game authorization service 204 logs various data, such as profile information, online activity, gameplay statistics, user to user relations and interactions, and other player information in a database 205. After verification occurs by the game authorization service 204, the client device 210 may initiate an online gaming session, which may call game management server 206. In one embodiment the game management server 206 may be a service that can link the client device 210 to an online game in a game hosting server 207. In some embodiments, the gaming infrastructure 200 may also incorporate an error analysis utility 209 and a resource management utility 208.

In some embodiments, each service generates an operative log during simulation, enabling the error analysis utility 209 to visualize performance across the entire gaming infrastructure 200 in real time. If performance is no longer efficient in one or more mock services, the interpretation of the operative log by the error analysis utility 207 can be indicative of operative faults to the developer, enabling a developer to utilize the dynamic reload (e.g., item 113 of FIG. 1B) functionality of configuration tool 101 to make real time modifications to the mock service in an effort to stabilize operative performance. In another embodiment, a developer may utilize the resource management utility 208 to reallocate hardware resources in an effort to make the current configuration of a configured service stable.

In some embodiments, the game service 203 is accessible to the developers, thus it may not exist as a configurable mock service within the software infrastructure 200. A developer may utilize the game service 203 for the gaming infrastructure 200 instead of a mock service. In another embodiment a mock service may be used to replicate gaming service 203. Similarly, the game authorization service 204, database 205, game hosting server 207, and game management service 206 can also be accessible to the developers.

To simplify discussion and not limit the present disclosure, the gaming infrastructure 200 is illustrated with a single client device 210 by way of example, however it is not limited to communicating with a single client. The client device 210 may be set of real client devices executing a real video game application being played by real users, alternatively, the client may also be a set of virtual client devices executing a video game application that receives input from virtual users. The topology of the software infrastructure 200 may also vary, in both its existing configured service configuration and all other configurations of various services. Additionally, the software infrastructure 200 need not be limited to online game services, it may pertain to any software application requiring connectivity to one or more services.

Figure 3A:
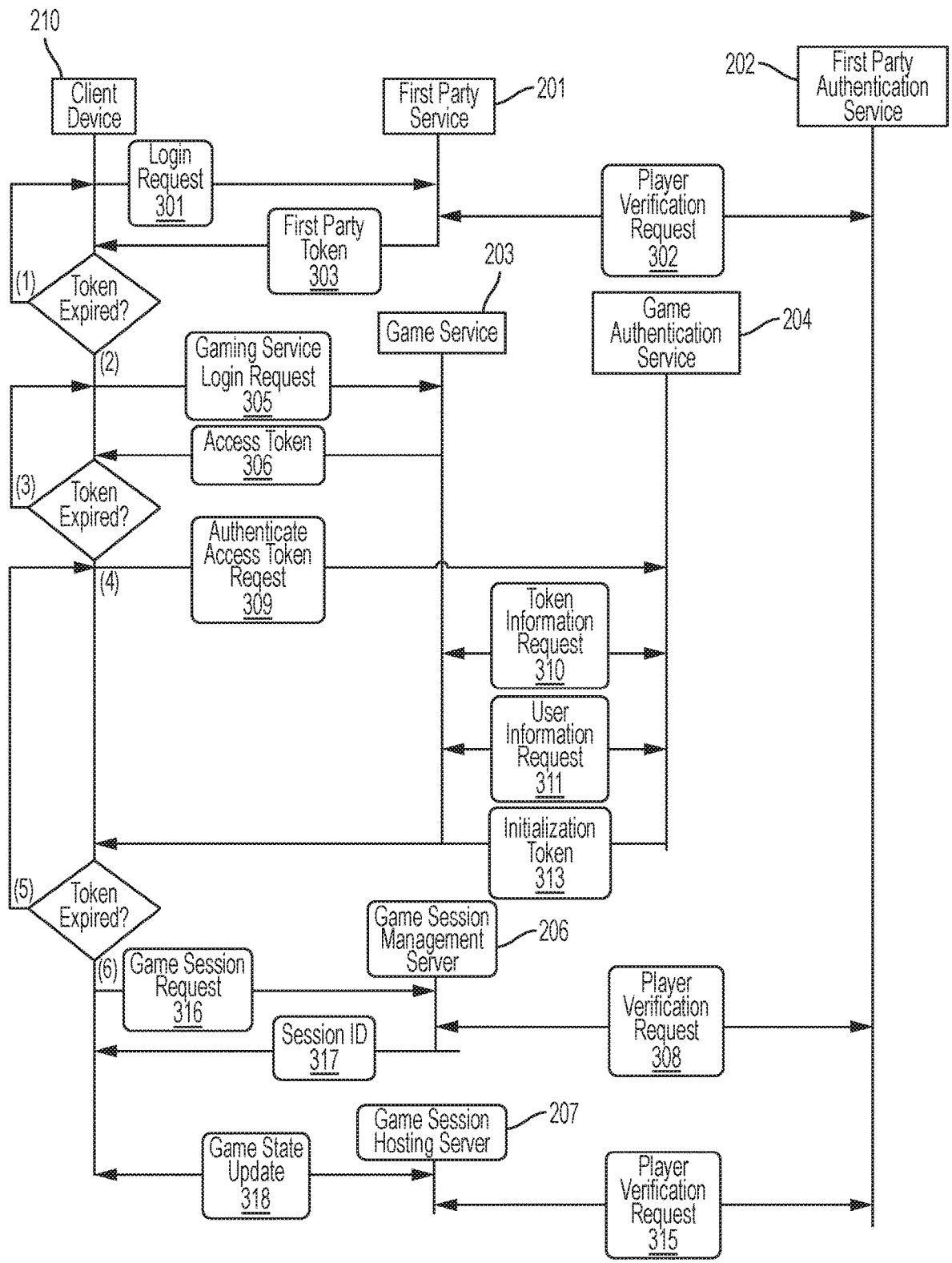
FIG. 3A depicts an operative flow of a production environment 300 for the software infrastructure 200 of FIG. 2, according to an implementation.

FIG. 3A depicts an operative flow of a production environment 300 for the software infrastructure 200 of FIG. 2. The method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can provide operations for mock services for software infrastructures. In one embodiment, load test environment 100 may perform method 300. Operations of method 300 may be performed in any order so as to fit the needs of the functionality to be provided. The operative flow of FIG. 3 illustrates one embodiment of an end to end system level communication that may occur between a client device 210 and the services of an infrastructure 300.

The operative flow begins with the client device 210 sending a login request 301 to a first party service 201. The first party 201 service receives the request from the client device 210 and verifies the authenticity of the login request 301 by sending a player verification request 302 to a first party authentication service 202. After receiving verification, the first party service 201 generates a login approval as a first party token 303. The client device 210 receives the first party token and successfully connects to the first party service 201. In one embodiment, the first party token 303 may be subject to expiration. The client device 210 may check the expiration of the first party token 303 at a given time interval. In another embodiment, first party service 201 may determine if the token has expired. If expired, at (1) the client device may trigger a refresh that reiterates through the first party service 201 login process described above. If the first party token 303 is not expired, at (2) the client device may request a game service login request 305 to a game service 203.

In some embodiments, the game service 203 generates an access token 306 that is sent to the client device 210 after approving the game service login request 305. The client device 210 may check for expiration 307 of the access token 306. If expired, at (3) the client device may trigger a refresh that reiterates through the game service 203 login process described above. If the access token 306 is not expired, at (4) the client device may continue by sending an access token authentication request 309 to the game authentication service 204.

In some embodiments, the game authentication service 204 is able to verify the authenticity of the access token 306 by sending a token information request 310 and a user information request 311 to the game service 203. If verified, the game authentication service 204 may generate a user status update 312 for the database 204. Alternatively, the client device 210 or the game service 203 may generate the user status update 312. The central authentication service 203 may send to the client 210 an initialization token 313, which can be used to initialize an online game. If the initialization token 313 is expired, at (5) the client device can trigger a refresh that reiterates through the token authentication process. If the initialization token 313 not expired, at (5) the client device 210 can continue by sending a game session request 316 to the game session management service 206.

In some embodiments, the game session management service 206 may generate a session identifier (ID) 317 to send back to the client 210. The client 210 can send a second player verification request 315 to the first party authentication service 202 to revalidate the online token. Once verified, the client 210 may connect to the respective game session by sending a game state update 318 to the game session hosting server 207. The game state update 318 may then be communicated between the client 210 and the game session hosting server 206. To simplify discussion and not limit the present disclosure, FIG. 3A illustrates a single client device connected to production environment 300 for an online video game, though other client devices and users may also be in connection to same production environment 300 such that multiplayer gameplay and online interaction between the client devices and players is facilitated. The end to end communications occurring between the client device 210 and the services of the production environment 300 are also illustrated by way of example.

Figure 3B:
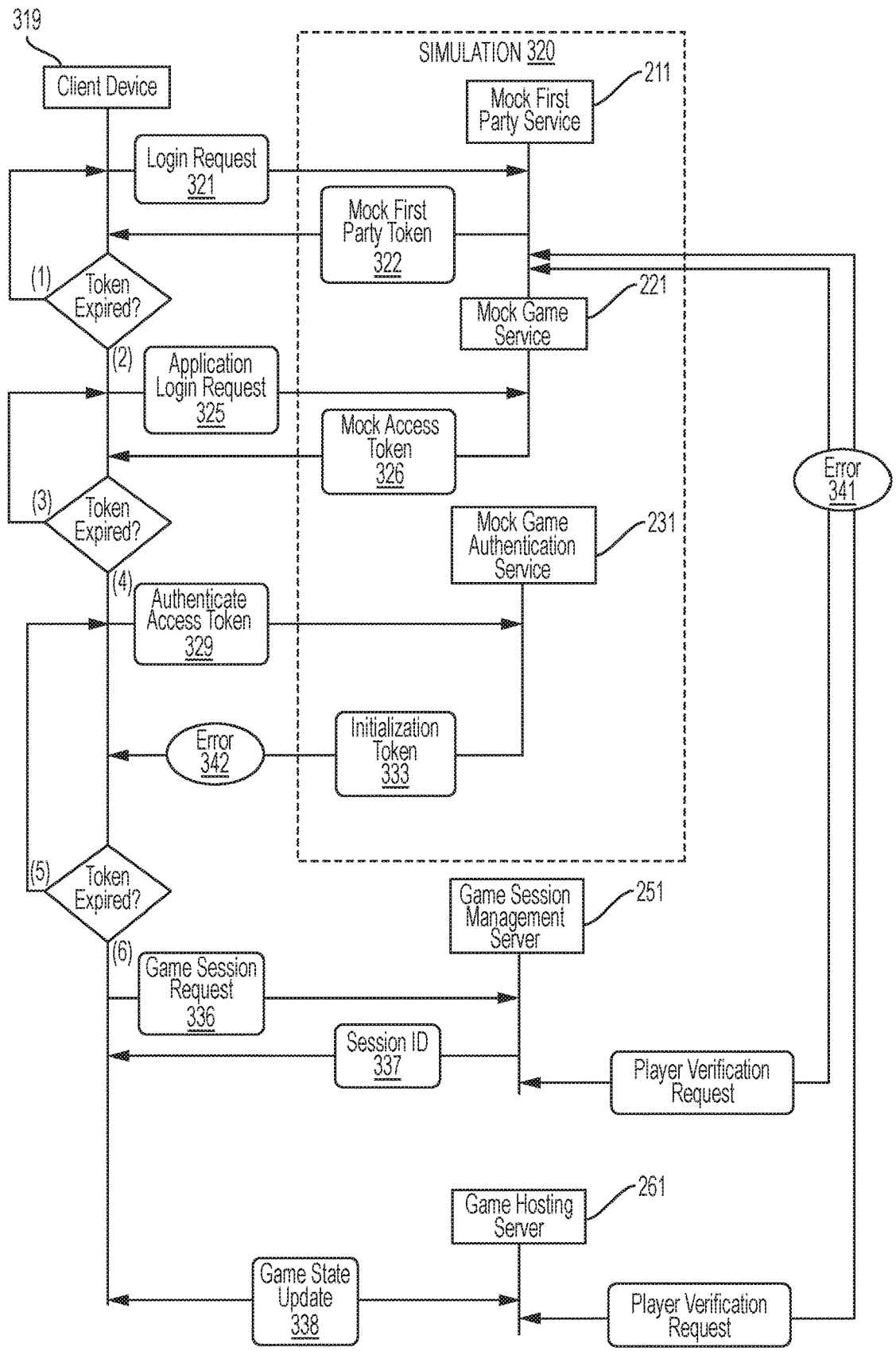
FIG. 3B illustrates a load test environment configuration for the production environment of FIG. 3A, according to an implementation.

FIG. 3B illustrates a load test environment configuration for the production environment 300 in FIG. 3A. The load test environment utilizes a simulation 320 of services, the simulation 320 including a mock first party service 211, a mock game service 221, and a mock game authentication service 231.

In some embodiments, the simulation 320 of services may not simulate the service dependencies of a service. For example, in FIG. 3A, the first party service 201 and game 203 may depend on the first party authentication service 202 and game authentication service 204, respectively. In one embodiment, the simulation 320 omits simulation service dependencies for a mock first party service 211 and the mock game service 221. The mock game authentication service 231 may be simulated as a stand-alone service that is not operatively in communication with the mock game service 221. The mock services (211, 221, 231) of the simulation 320 may be configured, by way of executable files, to operate as if they were in communication with their respective dependencies, such that they approximate (e.g., replicated) the operative process and load associated with their dependencies. By omitting the simulation of the service dependencies, the load test environment may replicate the operative load of a production environment at a lower computational cost.

In some embodiments, the simulation 320 of the load test environment is in operative communication with a client device 319. The client device 319 can execute a video game application to test the simulation 320 by initiating an online game session by sending a login request 321 to the mock first party service 211. The mock service 211 may receive the login request 321 and send the client 319 back a mock first party token 322. The mock first party token replicates an original first party token, allowing the client device 319 to continue on with execution as if has successfully logged into a first party service.

Similar to the operative flow of FIG. 3A, after validating an expiration check at (2), the client may continue by sending an application login request 325 to a mock game service 221, which can be configured to return a mock access token to the client 326. If the mock access token is not expired, the client can continue by sending authenticate access token 329 request to the mock game authentication service 231. In some embodiments, the mock game service 221 and the mock game authentication service may exist as the same service to reduce the computation cost of the load test environment. In some embodiments, a developer may also utilize the original game services. The mock game authentication service 231 may then send the client an initialization token 333 to start an online game.

At 6, if the initialization token 303 is not expired, the client may send a game session request 316 to the game session management server 251. The server may send a session ID 337 to the client device 210 so it may join an online game. Once received, the client device 210 may make a player verification call to the mock first party service 211. As part of the simulation, an error 341 may be invoked to test how the game hosting server 261 responds to the error.

Figure 4:
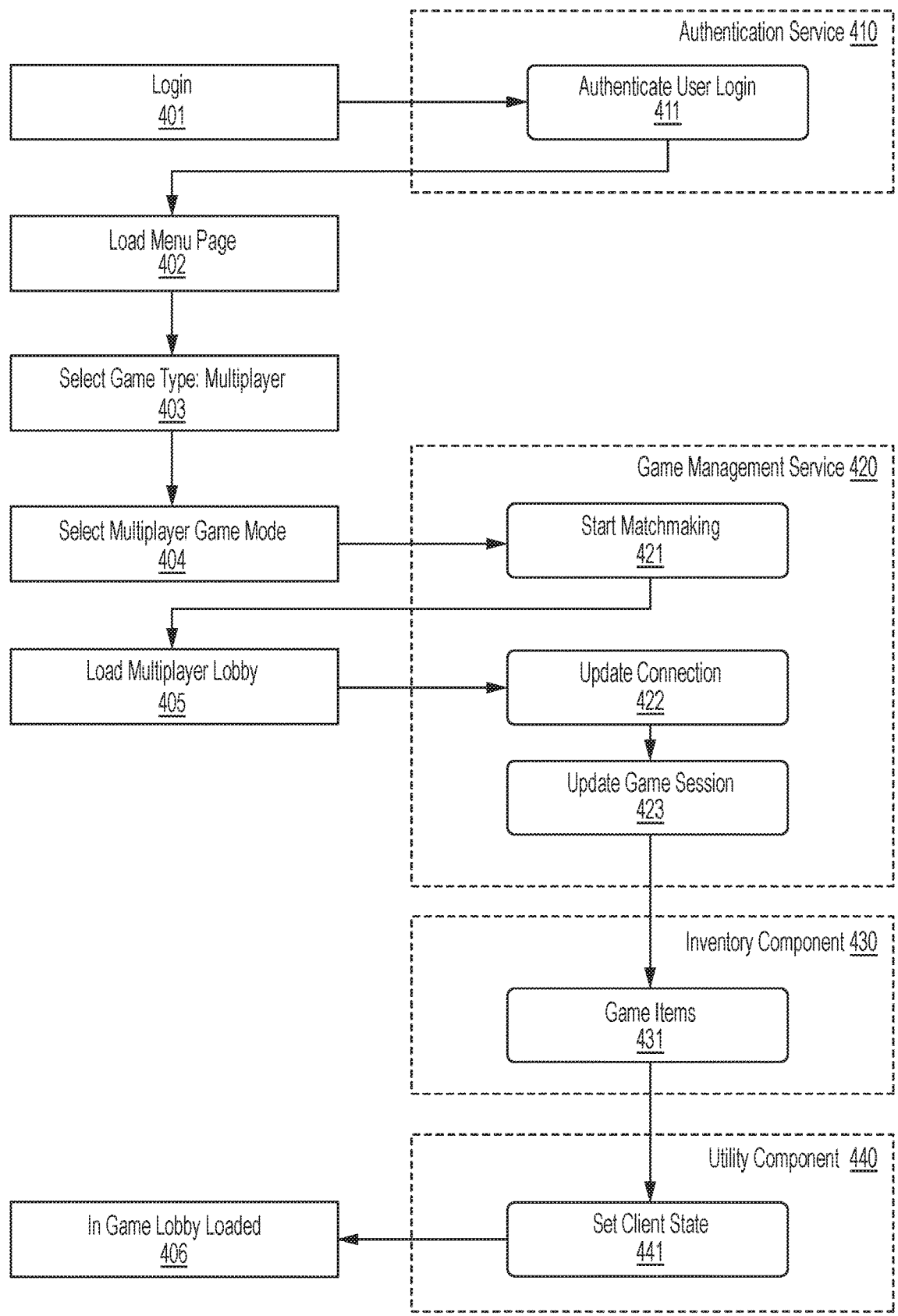
FIG. 4 illustrates an embodiment of a load test scenario that may occur within a client and configured services for an online game, according to an implementation.

FIG. 4 illustrates an embodiment of a load test scenario that may occur within a client and configured services for an online game, according to an implementation. In some embodiments, load test scenario is to test the operative functionality of a service layer of a load test environment.

Figure 6:
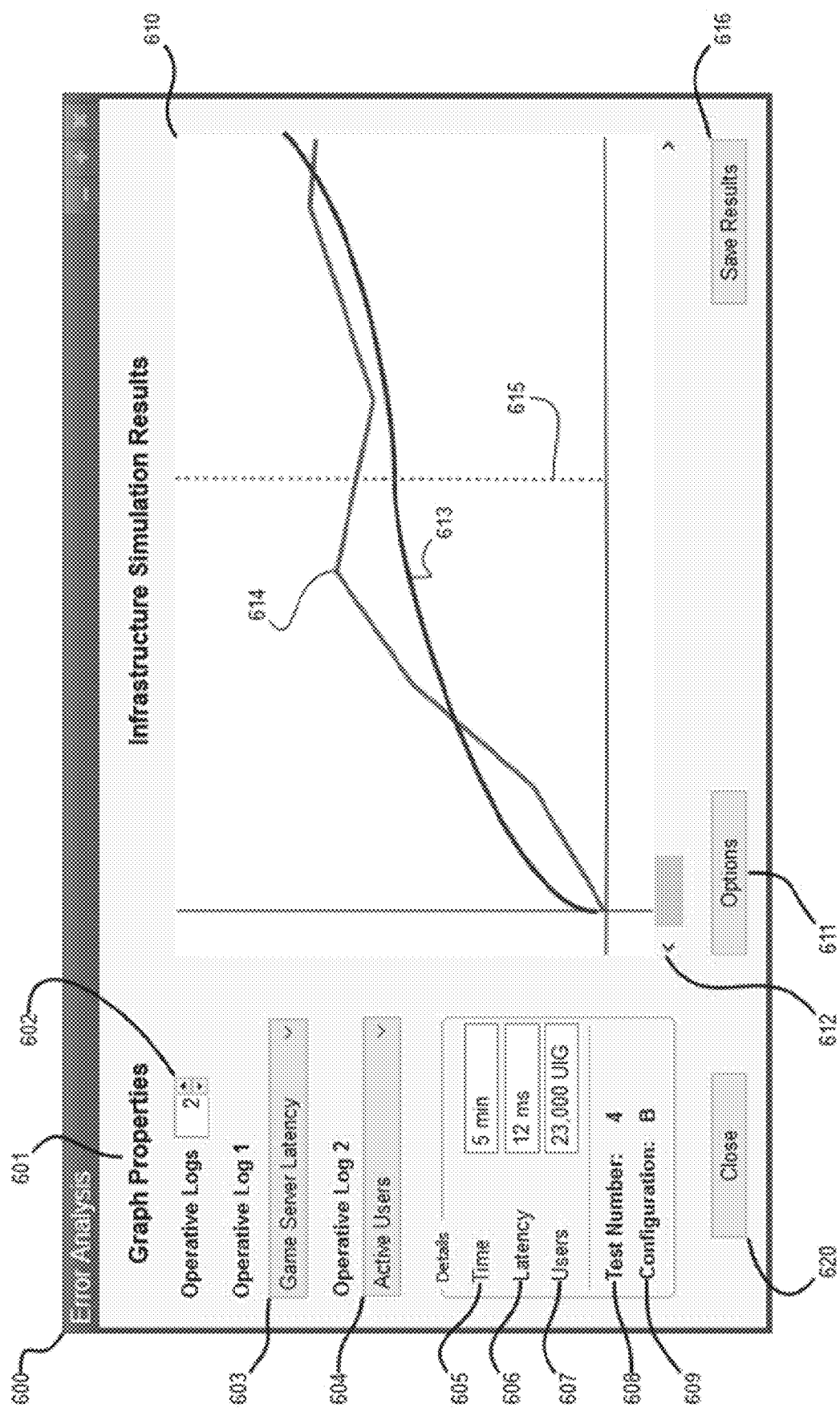
FIG. 6 illustrates an embodiment of a user interface for an error analysis utility, according to an implementation.

In some embodiments, a client device may invoke a login 401 on a gaming application, which links to a dedicated authentication service 410. The authentication service 410 may be responsible for authenticating a user login 411. If the authentication service 410 properly authenticates a login request 401, the load test scenario may continue to the next operative step. If the authentication service fails, the scenario may fail and cause an operative log to be sent to a device associated with a developer for inspection of the service. The operative log may be interpreted by an error analysis utility (as shown in FIG. 6). Some configured services may be responsible for more than one function. As the load test scenario continues, the gaming application may load a menu page 402, select the multiplayer game type 403, and select a multiplayer game mode 404 which may invoke the game management service 420. The game management service 420 may be perform a number of operative steps, and may be dependent upon an inventory component 430 and a utility component 440. The game management service 420 may include matchmaking 421 a user with other users. If accurately configured, the game management service 420 may cause the client to load a multiplayer lobby 405. When loaded into a multiplayer lobby 405, the client may recommunicate with the game management service 420 for a connection update 422, followed by a game session update 423. The operative steps that occur within a load test scenario may be monitored by the error analysis utility to assess the performance of a configured service. For example, if the connection update 422 and game session update 423 utilize a substantial amount of time to complete (e.g., exceed a defined threshold of time), a developer may suspend the load test scenario and modify the executable files of the game management service 420 to optimize operations. Once optimized, a developer may continue with the load test scenario or restart it from any point in the process, such as the loading of the multiplayer lobby 405 to immediately retest the update connection 422 and update game session 423 steps.

As the load test continues, the game management components 420 may request items 431 from an inventory component 430. The inventory component 430 may be linked to one or more databases to acquire the data of a particular request. Step 431 allows a developer to test a database in software infrastructure. If the database is unable to properly communicate with the inventory component 430, an operative log can be presented to the developer to identify the error. For example, unreadable return types may be a common error many developers encounter. When a service requests an item and is returned an item of an unreadable type (i.e., a service requests data in the form of a string and receives an integer), the service can fail to complete its function. By indicating errors such as these within an operative log in real time, a developer may quickly modify a script to accept the return type sent to the inventory component 430. The load test scenario may then continue to the utility component 440 which may set the client state 441 enabling the client to load an in game lobby 406 for joining an online game.

Figure 5:
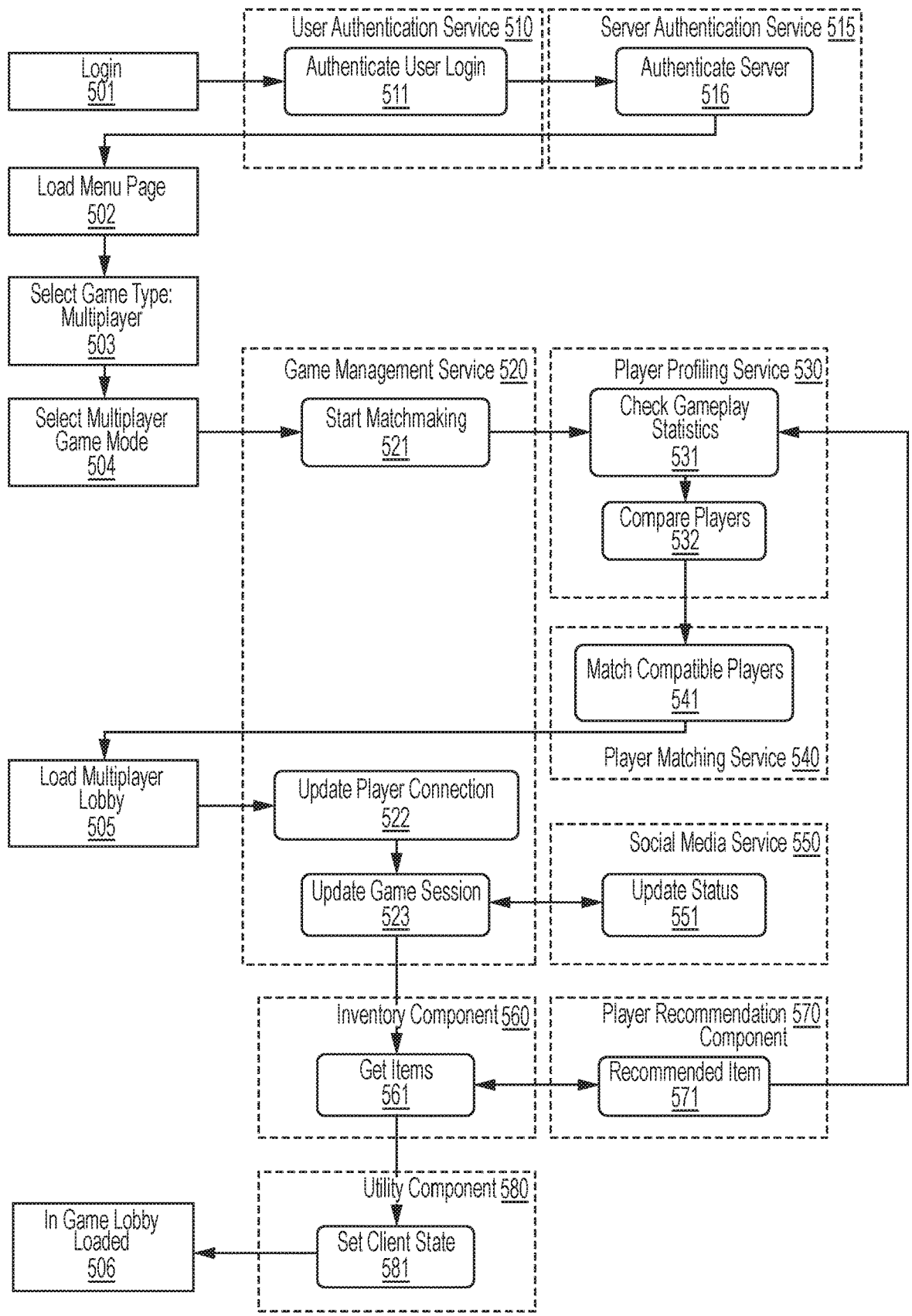
FIG. 5 illustrates an embodiment of a load test scenario that may occur between a client and configured services, and respective nested services, for an online game, according to an implementation.

FIG. 5 illustrates an embodiment of a load test scenario that may occur between a client and configured services, and respective nested services, for an online game, according to an implementation. The load test scenario of FIG. 5 extends upon the operative functionality of mock services in FIG. 4 by illustrating the operative flow of the simulation of both the mock services and their service dependencies. Such an implementation in a load test environment may be advantageous to developers for testing new services or updates to existing services.

In one embodiment, a client may invoke a login 501 on a gaming application, which may link to a user authentication service 510. The user authentication service 510 may authenticate the user login 511 and invoke a nested server authentication service 515 to authenticate a game server 516. If the game server 516 is active and responsive, the server authentication service 510 may pass the verification through to the user authentication service 510 and allow the client to load a menu page 502. If unsuccessful, an operative log that indicates the point of failure, such as within the parent configured service or the nested configured service, is sent to the developer for inspection. The operative log may be interpreted by an error analysis utility (as shown in FIG. 6). If successful, the client may continue by selecting the multiplayer game type 503 and selecting a multiplayer game mode 504, which may then communicate with game management service 520 to instantiate a game session.

In one embodiment, the game management service 520 may include nested services (e.g., the player profiling service 530 and the player matchmaking service 540), as well as a non-dependent social media service 550. When invoked by a client to start matchmaking 521 for an online multiplayer game session, the game management service 520 may invoke a player profiling service 530 to check the gameplay statistics 531 of a user and compare them to gameplay statistics of other players 532 who are currently online and attempting to join an online multiplayer game session. The comparable player data may be sent to a player matchmaking service 540 to match the most compatible players 540 to an online multiplayer gameplay session. Block 521 may allow a developer to test the current user base of a software application within the infrastructure.

For an online multiplayer game, accurate matchmaking 521 may be beneficial to the user experience. For example, if player profiling service 530 does not fail but lacks the logic to assess the compatibility of players when comparing players 532, the quality of the infrastructure may be degraded. Poor quality may be undetected when validating a service with a load test scenario. Un-detection may be avoided by enabling an error analysis utility to monitor the responses of external components, services, and devices. For example, if the error analysis utility is configured to generate an operative log for a connected device, the error analysis utility may alert a developer when an online multiplayer game session contains users who are considered to be incompatible players (i.e., higher rank or skill set). Alternatively, the error analysis tool may be configured to invoke a resource management utility prior to enabling a client to load a multiplayer lobby 505, so a developer may adjust the comparison logic of the player profiling service 530.

As the load test continues, the client may load a multiplayer lobby 505 with a set of compatible players, which may cause the game management server to update player connections 522 and update the game session 523. The game management service 520 may cause a social media service 550 to update the profile status 551 of the user. The social media service 550 may be a non-dependent service, and failure to receive a response from social media service 550 may not negatively affect the operative functionality infrastructure. In one embodiment, it may advantageous to monitor the interaction between the game management service 520 and the social media service 550. For example, if the social media service 550 may provide an insight to a gameplay experience of a user if he or she makes an online posting of their gameplay experience. The error analysis log may be configured to monitor the posting of real users who are performing a simulation or load test of an infrastructure to aggregate a gameplay review.

Components 560, 570, 580, and 590 may exist as system level components of a general service for the software infrastructure itself. As the load test scenario continues, the game management components 520 may send a request to the inventory component 560 to request items 561 for the game session. The get items 561 step may cause the dependent player recommendation component 570 to generate an item recommendation 571. Dependent player recommendation component may send a request to player profiling service 530 to check gameplay statics 531 to recommend an appropriate item (e.g., an advertisement, in application purchasable item, a digital gift item, a personalized promotional offer, and the like). After providing a recommendation, the inventory component 560 may case the utility component 580 to set the client state, such that the in game lobby on the client application is loaded 506.

FIG. 6 illustrates an embodiment of a graphical user interface (GUI) 600 of an error analysis utility. The GUI 600 may allow for the monitoring of the performance and error of a component of a software infrastructure, as described herein. The GUI 600 may enable a developer to set various graph properties 601, including the number of operative logs 602 to be interpreted. By way of example, the operative logs number 602 is set to "2" to illustrate a simple use case of the error analysis utility. The number of operative logs 602 may indicate the size of an operative log selection list (603, 604). The operative logs may include game server latency 603 and active users 604.

In one embodiment, latency and bandwidth constraints may be mimicked (e.g., injected into and/or analyzed) by mock services running in the software infrastructure. Mock services may return latency and bandwidth information relating to simulation data provided by the mock service. In one embodiment, atypical latency and bandwidth constraints may be flagged by the mock service for review. In one embodiment, if a network service normally responds within two seconds and in one instance takes 5-20 seconds to respond, the reduced latency and/or bandwidth may be analyzed and flagged. In another example, when a download service provides a fraction of the data needed per second, the latency and/or bandwidth associated with the download service may be provided and analyzed. Advantageously, by monitoring and analyzing latency and bandwidth, mock services in a software infrastructure may provide a good representation of real-world performance.

The error analysis tool may determine the most useful information of each operative log and present the information in the infrastructure simulation results graph field 610 of GUI 600. In this example, the x-axis represents a measurement of time and the y-axis is of the unit measurements of both latency (i.e., time in milliseconds) and active users (i.e., users in game or "UIG").

In one embodiment the rules sets may include any number of parameters and complex behaviors checked against the expected results and the actual results. In one example, the expected results and the actual results may be analyzed and, if there is sufficient error between both results, the results and analysis may be shown in the tool. The rule sets may include or exclude information based on priority characteristics. For example, data sets may be assigned a priority level and rule set may include, "show all data with priority 1" or "do not show priority 5 data." The rule sets may also include functional operators like AND or OR. For example, a rule set may include "provide all the information with errors <0.2% AND priority 1."

GUI 600 may present the details of the operative logs in dynamic fields (605, 606, 607), and the test identification number 608 and infrastructure configuration identification 609. The values of the dynamic fields (605, 606, 607) may determine the position of line 615, which may be an interactive line that allows a developer to view the details of the graphed operative logs at a given time of operation 605. The straight line 614 on the graph 610 is representative of the active users 604, and the curved line 613 on the graph 610 is representative of latency 604. The scroll bar beneath the graph 610 may allow a developer to scroll through the timeline of the operative logs. The save results button 616 may enable a developer to save the current configuration and details of the operations. The options button 611 may enable a developer to modify various properties of the user interface, such as, but not limited to, the graph resolution, additional properties, alternative layouts, and alternative graph configurations.

Figure 7:
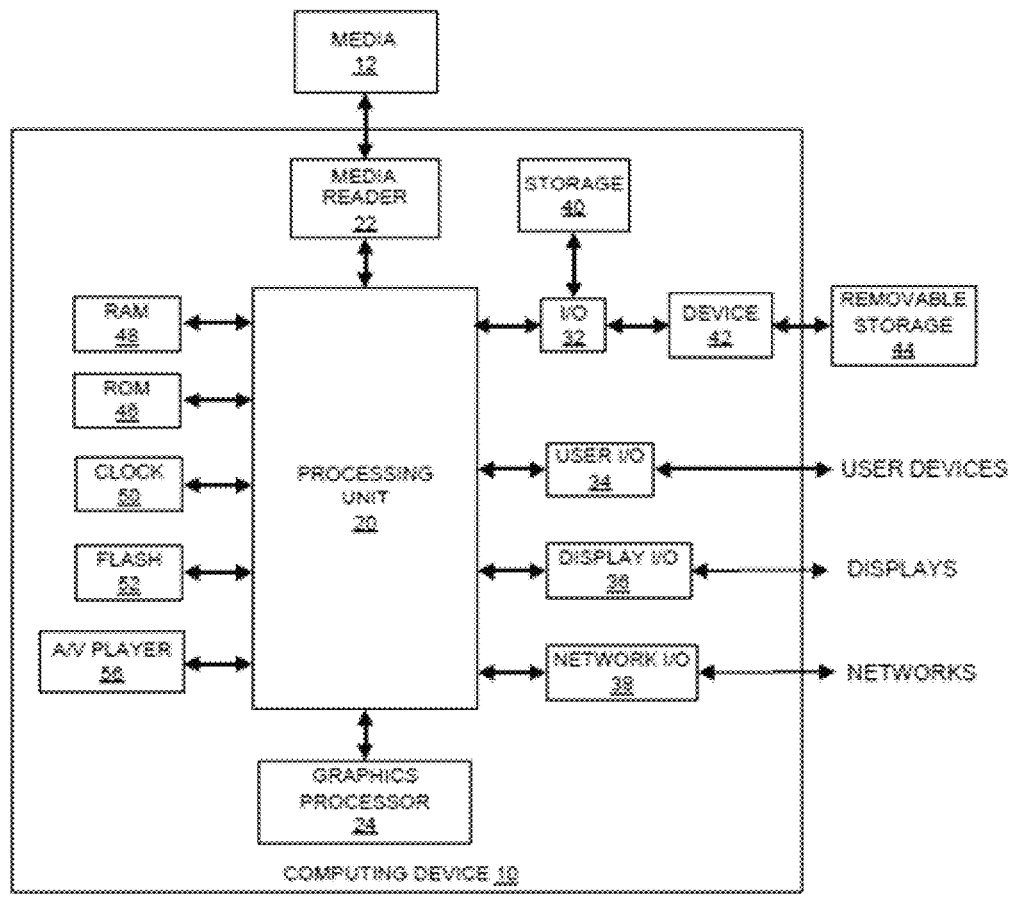
FIG. 7 is a block diagram of an example computer system that may perform one or more of the operations described herein, according to an implementation.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device includes one or more hardware processors (e.g., processing unit 20 and graphics processor 24). As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as keyboards or game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. Other components may also be provided in computing device 10 and that a person skilled in the art can appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it can be understood that data does not have to be stored in RAM 48 and may be stored in other memory accessible to processing unit 20 or distributed among several media, such as media 12 and storage 40.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations can be apparent to those of skill in the art upon reading and understanding the above description. The scope of the invention should, therefore, be determined with reference to the appended claims, along with the full scope of equivalents to which such claims are entitled.

In the above description, numerous details are set forth. It can be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "paring," "comparing," "identifying," "resolving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the described method steps. The structure for a variety of these systems can appear as set forth in the description below. In addition, the present invention is not described with reference to any particular programming language. It can be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.). The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A video game load test environment computing system, the system comprising:
   a memory; and
   one or more hardware processors coupled to the memory, the processors configured to:
      store a response message received from an external service in response to a request;
      configure a plurality of mock services simulating respective external services, wherein a mock service of the plurality of mock services includes a real component and a mock service component, wherein the mock service simulates an external service and shares a hardware property, a service component, and an executable file with the external service, wherein the executable file identifies the hardware property of the service component, an operative functionality of the service component, and an electronic communication between the mock service and at least one of: a client device, a database, or the external service, wherein the operative functionality simulates the external service by approximating functionality of the external service using the response message that has been previously received from the external service; and
      perform the mock service.

2. The video game load test environment computing system of claim 1, wherein the one or more hardware processors are further configured to:
   enable the operative functionality and electronic communication between the mock service and at least one of: the client device, the database, or the external service;
   generate a systematic error corresponding to at least one of: the service component, the client device, the database, or the external service;
   define parameters for the error analysis utility;
   generate a performance result, wherein the performance result indicates a performance metric and an error metric of the mock service; and
   provide the performance result for display on a client device.

3. The video game load test environment computing system of claim 1, wherein the one or more hardware processors are further configured to: record the operative functionality of the service component and the electronic communication between the mock service and at least one of: the client device, the database, or the external service to a log file.

4. The video game load test environment computing system of claim 1, wherein the video load test environment computing system is implemented across multiple computing devices.

5. The video game load test environment computing system of claim 1, wherein the mock service is a replica of the external service.

6. The video game load test environment computing system of claim 1, wherein the mock service comprises one or more nested mock services.

7. The video game load test environment computing system of claim 1, wherein the configuration tool is further configured to perform at least one of: create, assign, configure, modify, replicate, or delete the executable file of at least one of: the mock service, service component, client device, or database of the software infrastructure.

8. The video game load test environment computing system of claim 1, wherein the configuration tool is further to generate a network topology between the mock service and at least one of: a client device, a database, or an external service of the software infrastructure.

9. A method of generating a software infrastructure in a load test environment computing system, the method comprising:
   storing a response message received from an external service in response to a request;
   configure a plurality of mock services simulating respective external services, wherein a mock service of the plurality of mock services includes a real component and a mock service component, wherein the mock service simulates an external service and shares a hardware property, a service component, and an executable file with the external service, wherein the executable file identifies the hardware property of the service component, an operative functionality of the service component, and an electronic communication between the mock service and at least one of: a client device, a database, or the external service, wherein the operative functionality simulates the external service by approximating functionality of the external service using the response message that has been previously received from the external service; and
   performing the mock service of the software infrastructure based on the executable file and the service component.

10. The method of claim 9, wherein performing the mock service comprises:
    enabling the operative functionality and electronic communication between the mock service and at least one of: the client device, the database, or the external service; and generating a systematic error corresponding to at least one of: the service component, the client device, the database, or the external service;

generating a performance result, wherein the performance result indicates a performance metric and an error metric of the mock service; and providing the performance result for display on a client device.

11. The method of claim 9, further comprising recording the operative functionality of the service component and the electronic communication between the mock service and at least one of: the client device, the database, or the external service to a log file.

12. The method of claim 9, wherein multiple computing devices comprise the one or more hardware processors.

13. The method of claim 9, wherein the mock service is a replica of the external service.

14. The method of claim 9, further comprising:

modifying the executable file of at least one of: the mock service, service component, client device, or database of the software infrastructure; and re-simulating the mock service of the software infrastructure based on the modified executable file and the service component.

15. The method of claim 9, further comprising generating a network topology between the mock service and at least one of: a client device, a database, or an external service of the software infrastructure.

16. A non-transitory machine readable storage medium storing instructions which when executed cause one or more processors to:

store a response message received from an external service in response to a request;

configure a plurality of mock services simulating respective external services, wherein a mock service of the plurality of mock services includes a real component and a mock service component, wherein the mock service simulates an external service and shares a hardware property, a service component, and an executable file with the external service, wherein the executable file identifies the hardware property of the service component, an operative functionality of the service component, and an electronic communication between the mock service and at least one of: a client device, a database, or the external service, wherein the operative functionality simulates the external service by approximating functionality of the external service using the response message that has been previously received from the external service; and performing the mock service of the software infrastructure based on the executable file and the service component.

17. The non-transitory machine readable storage medium of claim 16, wherein to perform the mock service the one or more hardware processors further to:

enable the operative functionality and electronic communication between the mock service and at least one of: the client device, the database, or the external service;

generate a systematic error corresponding to at least one of: the service component, the client device, the database, or the external service;

generate a performance result, wherein the performance result indicates a performance metric and an error metric of the mock service; and provide the performance result for display on a client device.

18. The non-transitory machine readable storage medium of claim 16, wherein the one or more processors further to record the operative functionality of the service component and the electronic communication between the mock service and at least one of: the client device, the database, or the external service to a log file.

19. The non-transitory machine readable storage medium of claim 16, wherein the mock service is a replica of the external service.

20. The non-transitory machine readable storage medium of claim 16, wherein the configurable mock service comprises one or more nested configurable mock services.

* * * * *